United States Patent
Yamaguchi et al.

(10) Patent No.: US 8,150,472 B2
(45) Date of Patent: Apr. 3, 2012

(54) MOBILE TERMINAL, DISPLAY METHOD, DISPLAY MODE DETERMINING PROGRAM, AND COMPUTER-READABLE STORAGE MEDIUM

(75) Inventors: Kouichi Yamaguchi, Higashihiroshima (JP); Takayuki Hayashi, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 526 days.

(21) Appl. No.: 12/439,976

(22) PCT Filed: Jun. 26, 2007

(86) PCT No.: PCT/JP2007/062759
§ 371 (c)(1),
(2), (4) Date: Mar. 4, 2009

(87) PCT Pub. No.: WO2008/032486
PCT Pub. Date: Mar. 20, 2008

(65) Prior Publication Data
US 2009/0253464 A1    Oct. 8, 2009

(30) Foreign Application Priority Data
Sep. 12, 2006 (JP) .................... 2006-247307

(51) Int. Cl.
*H04M 1/00* (2006.01)

(52) U.S. Cl. ..................... 455/566; 455/556.2
(58) Field of Classification Search ........... 379/93, 379/96, 354; 455/566, 556.2
See application file for complete search history.

(56) References Cited

U.S. PATENT DOCUMENTS

| 5,884,185 A * | 3/1999 | Kim ............................ 455/566 |
| 6,223,058 B1 * | 4/2001 | Sudo et al. ................... 455/564 |
| 7,092,495 B2 * | 8/2006 | Kraft et al. ................. 379/88.11 |
| 7,693,556 B2 * | 4/2010 | Park et al. ................. 455/575.1 |
| 2003/0158651 A1 | 8/2003 | Matsuo et al. |

FOREIGN PATENT DOCUMENTS

| JP | 62-206620 A | 9/1987 |
| JP | 4-326414 A | 11/1992 |
| JP | 2003-174497 A | 6/2003 |
| JP | 2003-244770 A | 8/2003 |
| JP | 2003-298716 A | 10/2003 |

* cited by examiner

*Primary Examiner* — Brian Young
(74) *Attorney, Agent, or Firm* — Birch, Stewart, Kolasch & Birch, LLP

(57) ABSTRACT

Function distinguishing marks are efficiently displayed which correspond to a plurality of functions assigned to a single operation key, respectively.

A mobile phone (1) changes in accordance with the number of functions assigned to a single operation key the number of the function distinguishing marks to be displayed which indicate functions.

7 Claims, 10 Drawing Sheets

F I G. 2
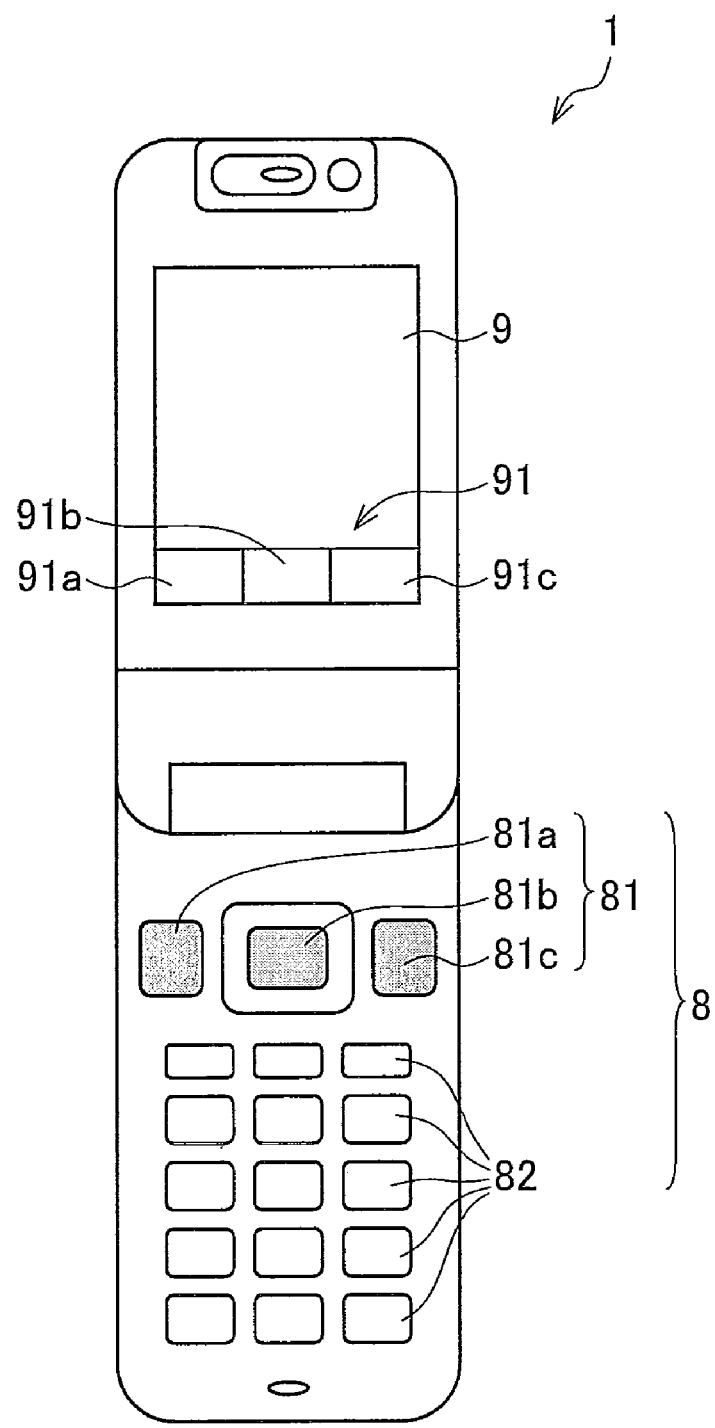

FIG. 3

|  | DISPLAY MODE | |
|---|---|---|
|  | ONE-LINE DISPLAY | TWO-LINE DISPLAY |
| SELECTED SCREEN / PICTURE | SHORT PUSH: CHECK<br>LONG PUSH : NOTHING | SHORT PUSH: CHECK<br>LONG PUSH : HIGH-SPEED INFRARED TRANSMISSION |
| SELECTED SCREEN / BROWSER | SHORT PUSH: BACK<br>LONG PUSH : NOTHING | SHORT PUSH: BACK<br>LONG PUSH : FORWARD |

FIG. 4

|  | CHECK | |
|---|---|---|
|  | CHECKED | UNCHECKED |
| HIGH-SPEED INFRARED TRANSMISSION / POSSIBLE | ONE-LINE DISPLAY | TWO-LINE DISPLAY |
| HIGH-SPEED INFRARED TRANSMISSION / IMPOSSIBLE | ONE-LINE DISPLAY | TWO-LINE DISPLAY |

FIG. 5

| | | DISPLAY MODE | |
|---|---|---|---|
| | | ONE-LINE DISPLAY | TWO-LINE DISPLAY |
| SELECTED SCREEN | PICTURE | CHECK | FIRST LINE : CHECK<br>SECOND LINE: INFRARED TRANSMISSION |
| | BROWSER | BACK | FIRST LINE : BACK<br>SECOND LINE: FORWARD |

F I G. 1 1

MOBILE TERMINAL, DISPLAY METHOD, DISPLAY MODE DETERMINING PROGRAM, AND COMPUTER-READABLE STORAGE MEDIUM

TECHNICAL FIELD

The present invention relates to a mobile terminal that displays function distinguishing marks indicating functions assigned to an operation key, and a method for displaying the function distinguishing marks.

BACKGROUND ART

In mobile terminals such as portable phones, arts for calling more easily a target function of a user have been proposed, as functions available to a user have increased.

For example, an arrangement has been widely employed in which (i) a function list is displayed on a menu panel and (ii) a user is prompted to select a target function from functions thus displayed.

However, this arrangement adversely increases the number of operations.

In view of this, an invention disclosed in Patent Document 1 realizes an arrangement in which two different functions are assigned to a single operation key and the single operation key is pushed down long or short, so that either one of the two different functions is selected. This arrangement makes it possible to call a target function instead of increasing the number of operations.

Portable phones having such an arrangement have been available commercially. It is possible to take a portable phone SH705 (Sharp Corporation) as an example of such portable phones. The portable phone SH705 is arranged such that a first function is called in a case where an operation key for calling functions (hereinafter, referred to as function calling key) is pushed down short, whereas a second function is called in a case where the function calling key is pushed down long. A function distinguishing mark indicating the first function is displayed on a display section of the portable phone but a function distinguishing mark indicating the second function is not displayed.

There has realized an arrangement in which (i) five function calling keys, to which different functions are assigned, are provided, respectively, and (ii) five function names are displayed in two lines on each of the right and left sides and in a line in the center. It is possible to take a portable phone SH902i (Sharp Corporation) as a portable phone having such an arrangement. The portable phone SH902i always reserves on a screen five display areas for displaying five function names.

[Patent Document 1] Japanese Unexamined Patent Application Publication 2003-298716 (Tokukai 2003-298716, date of publication: Oct. 17, 2003)

DISCLOSURE OF INVENTION

According to the arrangement of a portable phone SH705, unfortunately, a user cannot know, by merely looking at a display section, what a second function to be called in a case where a function calling key is pushed down long is. This is because the portable phone SH705 displays on the display section only a function distinguishing mark indicating a first function to be called in a case where the function calling key is pushed down short. That is, the second function is a kind of hidden function. Therefore, in consideration of usability, it is difficult to employ an arrangement in which the second function is varied according to an application to be used in the portable phone. Therefore, a same function is always assigned to the second function.

In order to solve the problem, it is possible to always secure a plurality of display areas where function distinguishing marks of a single function calling key are displayed. However, it is rare that a plurality of functions are always assigned to a single function calling key. Therefore, if a plurality of display areas are always secured for a single function calling key, then there occurs a problem of consumption of a display space of the display section. In addition, a space for displaying the function distinguishing marks is limited. Therefore, if a plurality of display areas are always secured for a single function calling key, then there occurs a reduction in area for displaying a single function distinguishing mark. This also causes a problem of decrease in viewability of the function distinguishing marks.

The present invention has been made in view of the problems. An object of the present invention is to provide a mobile terminal capable of efficiently displaying function distinguishing marks corresponding respectively to a plurality of functions assigned to a single operation key.

A mobile terminal according to the present invention is a mobile terminal capable of executing a plurality of functions in response to different operations to be performed with respect to a single operation key, including display means for displaying a plurality of function distinguishing marks indicating the plurality of functions, the number of the function distinguishing marks to be displayed being changed in accordance with the number of the functions assigned to the single operation key.

A display method according to the present invention is a display method for displaying a plurality of function distinguishing marks in a mobile terminal, said mobile terminal capable of executing a plurality of functions in response to different operations to be performed with respect to a single operation key, the mobile terminal including display means for displaying the plurality of function distinguishing marks indicating the plurality of functions, said method including the step of changing the number of the function distinguishing marks to be displayed in accordance with the number of the functions assigned to the single operation key.

In a case where two functions are assigned to a single operation key, according to a conventional art, one function is not displayed on a screen of the display means although the other function is displayed on the screen.

According to the arrangement, the mobile terminal changes the number of the function distinguishing marks to be displayed on the screen of the display means, in accordance with the number of the functions assigned to the single operation key. For example, the mobile terminal displays one function distinguishing mark corresponding to one function in a case where the one function is assigned to an operation key. On the other hand, the mobile terminal displays two function distinguishing marks corresponding respectively to two functions in a case where the two functions are assigned to the operation key.

Therefore, the mobile terminal can notify a user that a plurality of functions are assigned to a single operation key, by displaying via the display means function distinguishing marks corresponding to the plurality of functions, in a case where the plurality of functions are assigned to the a single operation key. In addition, the number of the function distinguishing marks to be displayed can be changed in accordance with the number of functions assigned to the operation key. This makes it possible to efficiently use the display space of the display means.

Furthermore, changing in accordance with the number of the functions assigned to the operation key the number of the function distinguishing marks to be displayed makes it possible to notify a user what function is executable at the point of time of the change. This makes it possible to instruct the user what operation should be performed next, and thereby guide the user.

As described above, the mobile terminal according to the present invention is arranged such that the number of the function distinguishing marks to be displayed, which indicate functions assigned to a single operation key, is changed in accordance with the number of the functions.

As described above, the display method according to the present invention includes a step of changing, in accordance with the number of the functions assigned to the single operation key, the number of the function distinguishing marks, indicating the functions, to be displayed.

As a result, this makes it possible to efficiently display the unction distinguishing marks corresponding respectively to a plurality of functions assigned to a single operation key.

BRIEF DESCRIPTION OF DRAWINGS

FIG. 2 is a schematic diagram illustrating a schematic view of the portable phone of the embodiment of the present invention.

FIG. 3 is a diagram illustrating one example of a function assigning table.

FIG. 4 is a diagram illustrating one example of a display mode determining table.

FIG. 5 is a diagram illustrating one example of a function name display table.

FIG. 11 is a diagram showing another modification of the display method for displaying the function distinguishing marks.

EXPLANATION OF REFERENCE LETTERS AND NUMERALS

Figure 1:
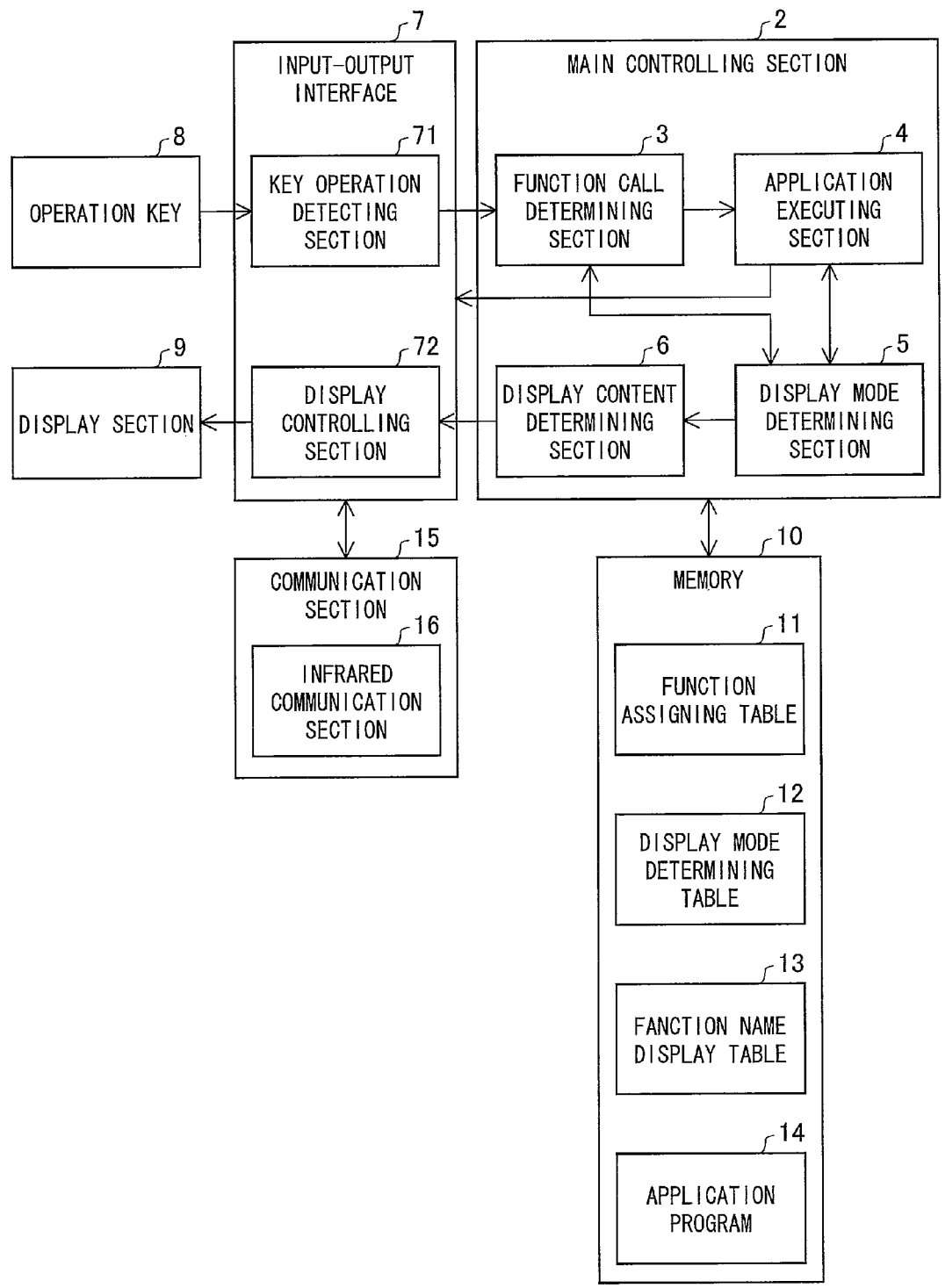
FIG. 1 is a schematic diagram illustrating an arrangement of a portable phone of an embodiment of the present invention.

1 Portable Phone
9 Display section (display means)
81 Function calling key (operation key)
81*a* Left soft key (operation key)
81*b* Central soft key (operation key)
81*c* Right soft key (operation key)
92*a* Function distinguishing mark
92*b* Function distinguishing mark
92*c* Function distinguishing mark
92*d* Function distinguishing mark
92*e* Function distinguishing mark
93 Function distinguishing mark
94 Function distinguishing mark

BEST MODE FOR CARRYING OUT THE INVENTION

The following describes an embodiment of the present invention with reference to FIGS. 1 through 10. The following description deals with a case where a portable phone 1 is exemplified by an example of a mobile terminal according to the present invention. The present invention is, however, not limited to a portable phone. That is, the present invention can be applied to any kinds of mobile terminals, provided that (i) a plurality of functions can be assigned to a single operation key and (ii) the mobile terminal includes a display section for displaying function distinguishing marks indicating the plurality of functions.

FIG. 2 is a schematic diagram schematically illustrating the portable phone 1. As illustrated in FIG. 2, the portable phone 1 is a mobile terminal having a plurality of functional modes. The portable phone 1 includes a plurality of operation keys 8 to be used for input operations, and a display section 9 (display means) for displaying a result processed by the portable phone 1. The display section 9 is exemplified by a liquid crystal display.

The operation keys 8 include function calling keys 81 and a numeric keypad 82. The numeric keypad 82 is provided for entering characters, numerals, signs, etc. The function calling keys 81 are provided for calling predetermined functions of the portable phone 1. According to the function calling keys 81, it is possible to call a plurality of functions in response to different operations (a short push or a long push) with respect to a single function calling key. That is, the different operations with respect to a single function calling key 81 indicate that a period during which the single function calling key 81 is pushed down varies depending on a function to be called.

A left soft key 81*a*, a central soft key 81*b*, and a right soft key 81*c* are provided as the function calling keys 81. Names of functions assigned to the left soft key 81*a*, the central soft key 81*b*, and the right soft key 81*c* are indicated by function distinguishing marks to be displayed in a left-side display area 91*a*, a central display area 91*b*, and a right-side display area 91*c*, respectively, in a function name display area 91 of the display section 9.

FIG. 1 is a schematic diagram schematically illustrating an arrangement of the portable phone 1 of the present embodiment. As illustrated in FIG. 1, the portable phone 1 includes a main controlling section 2, an input-output interface 7, operation keys 8, a display section 9, a memory 10, and a communication section 15. Although the portable phone 1 includes members, such as a speaker and a microphone, for functioning as a portable phone, the members are omitted in FIG. 1.

The input-output interface 7 includes a key operation detecting section 71 and a display controlling section 72.

The key operation detecting section 71 detects an operation performed by a user with respect to an operation key 8, and supplies to the main controlling section 2 a detected result indicative of which key has been pushed down. In a case where a function calling key 81 is pushed down, the key operation detecting section 71 determines whether or not such a function calling key 81 is pushed down for predetermined time or longer, and then, supplies the result thus determined to the main controlling section 2. That is, the key operation detecting section 71 determines whether a function calling key 81 is pushed down short or long. The predetermined time is two seconds, for example.

The display controlling section 72 controls the display section 9 so as to cause the display section 9 to display information supplied from the main controlling section 2.

The memory 10 stores a function assigning table 11, a display mode determining table 12, a function name display table 13, and an application program 14. The details of each of the tables are described later. The memory 10 also stores various kinds of data (not illustrated) such as image data collected by a user.

The main controlling section 2 includes a function call determining section 3, an application executing section 4, a display mode determining section 5, and a display content determining section 6.

The function call determining section 3 determines, based on information supplied from the key operation detecting section 71, what operation is performed by a user and which function is called by the user, and then supplies the results thus determined to the application executing section 4. Particularly, in a case where a function calling key 81 is pushed down, the function call determining section 3 determines which function has been called, based on (i) information indicative of which function calling key has been pushed down and (ii) a period during which the function calling key has been pushed down. The function is determined with reference to a function assigning table 11 corresponding to an application which is being executed by the application executing section 4 (i.e., corresponding to a functional mode selected by a user). It is possible to obtain information indicative of which function assigning table 11 should be referred to moment to moment, by checking and seeing the display mode determining section 5.

The application executing section 4 boots an application program 14 corresponding to a function determined by the function call determining section 3, and carries out various processes in response to instructions from a user. A user is notified of what is executed by an application, via the display section 9 or the speaker (not illustrated).

The display mode determining section 5 determines a display mode of a function distinguishing mark to be displayed on the function name display area 91, in accordance with information supplied from the application executing section 4. Then, the display mode determining section 5 supplies the result thus determined to the display content determining section 6. In other words, the display mode determining section 5 changes, in accordance with the number of functions assigned to a function calling key 81, the number of the function distinguishing marks, indicative of such functions, to be displayed on the screen of the display section 9. This is determined with reference to the display mode determining table 12.

The display content determining section 6 determines a display content, i.e., which function distinguishing mark should be displayed in the function name display area 91, in accordance with the determination result supplied from the display mode determining section 5. In particular, the display content determining section 6 changes the sizes of the function distinguishing marks to be displayed on the screen of the display section 9, in accordance with the number of the function distinguishing marks to be displayed, the number being determined by the display mode determining section 5. The determination of the display content is made with reference to the function name display table 13. The display content determining section 6 supplies information on the display content of the function distinguishing marks to the display controlling section 72.

(Example of Function Assigning Table 11)

The following describes one example of the function assigning table 11 with reference to FIG. 3. FIG. 3 is a diagram illustrating an example of the function assigning table 11. Which function is assigned to a function calling key 81 varies depending on a screen to be displayed by an application which is selected by a user.

FIG. 3 shows function names to be assigned to, for example, the right soft key 81*c* of the function calling keys 81, (i) in a case where a picture screen is selected for browsing, editing, or transferring image data (not illustrated) stored in the memory 10, and (ii) in a case where a screen for displaying a browser for browsing web pages on the Internet.

As illustrated in FIG. 3, specifically, "Check" is assigned to the short push of the right soft key 81*c* whereas no function is assigned to the long push of the right soft key 81*c*, in a case where the picture screen is being selected and a function name is displayed in a line. The "Check" indicates a function of selecting a plurality of images by placing a checkmark. None of the images can be transmitted during placing the checkmark.

On the other hand, "Check" is assigned to the short push of the right soft key 81*c* and "high-speed infrared communication" is assigned to the long push of the right soft key 81*c*, in a case where function names are displayed in two lines. The "high-speed infrared communication" indicates a function of transmitting a selected image to an external device with the use of the high-speed infrared communication.

Although it is preferable that not the "Check" but "Uncheck" which indicates a function of taking the checkmarks off be assigned to the short push of the right soft key 81*c*, in a case where a user selects an image which has already been selected by placing a checkmark. In this regard, nothing is illustrated in FIG. 3 for simplicity of explanation.

In a case where the screen for displaying the browser is being selected and a function name is displayed in a line, "Back" is assigned to the short push of the right soft key 81*c* whereas no function is assigned to the long push of the right soft key 81*c*. On the other hand, "Back" is assigned to the short push of the right soft key 81*c* and "Forward" is assigned to the long push of the right soft key 81*c* in a case where the function names are displayed in two lines. The "Back" and the "Forward" are functions causing a user to perform an operation for tracing back the history of browsed web pages.

The description above has dealt with a case where the picture screen is being selected and a case where the screen for displaying the browser is being selected. The function assigning table 11 can be further provided for other screens. A function assigning table 11 can be provided for each application. Alternatively, a single comprehensive function assigning table 11 can be provided.

It can be suitably determined which function should be or not be assigned to each of the short push and the long push of each of the three function calling keys 81.

For example, "Display," which indicates a function of zooming in an image can be assigned to the short push of the central soft key 81*b*, and "high-speed infrared communication" can be assigned to the long push of the central soft key 81*b*, in a case where the picture screen is displayed. Similarly, "Cancel" can be assigned to the short push of the right soft key 81*c* and "Undo" can be assigned to the long push of the right soft key 81*c*, in a case where a screen of a text editor is displayed.

Note that it is preferable that a function to be assigned to the long push be a function which (i) is used relatively often and (ii) is convenient if accessible without calling an option menu key. In addition, it is preferable to avoid assigning to a single function calling key a pair of functions that causes a wrong operation in a case where the functions are assigned to a single function calling key. Frequent use of the long push causes a decrease in viewability of the function distinguishing marks. Therefore, it is preferable to minimize the use of the long push.

A further example of a function to be assigned to the long push encompass switching between a memory card and an internal memory while a data folder is operated.

(Example of Display Mode Determining Table 12)

The following describes an example of the display mode determining table 12 with reference to FIG. 4. FIG. 4 shows the display mode determining table 12 to be used for determining whether to display on a picture screen the function distinguishing marks in a line or in two lines, i.e., the display mode determining table 12 to be used for determining whether the number of the function distinguishing marks to be displayed should be one (1) or two (2).

As illustrated in FIG. 4, a function distinguishing mark is displayed in a line on the picture screen, in a case where there is an image selected by placing a checkmark (the number of the function distinguishing marks to be displayed is one (1)). On the other hand, function distinguishing marks are displayed in two lines in a case where there is no image selected by placing a checkmark and a selected image is a file transmittable with the use of the high-speed infrared communication (the number of the function distinguishing marks to be displayed is two (2)). In a case where there is no image selected by placing a checkmark and a selected image is not a file transmittable with the use of the high-speed infrared communication, a function distinguishing marks is displayed in a line (the number of the function distinguishing marks to be displayed: one (1)).

The display mode determining section 5 determines the number of the function distinguishing marks to be displayed, by comparing the display mode determining table 12 with a state of a process being executed by the application executing section 4, i.e., what operation is being carried out by a user.

A display mode determining table 12 is provided for each application, or, for each process (subroutine) of an application. It is possible to suitably alter, according to the application, how the display mode determining table 12 is to be prepared.

(Example of Function Name Display Table 13)

The following description deals with an example of the function name display table 13 with reference to FIG. 5. FIG. 5 is a diagram illustrating an example of the function name display table 13 showing how to display function distinguishing marks on a picture screen and on a browser screen.

As illustrated in FIG. 5, a function distinguishing mark indicating "Check" is displayed in a line, in a case where the picture screen is being selected and a function name is displayed in a line. On the other hand, in a case where function names are displayed in two lines, the function distinguishing mark indicating "Check" is displayed in a first line, and a function distinguishing mark indicating "infrared communication" is displayed in a second line.

It is preferable that, in a case where a user selects an image selected by placing a checkmark, that a function distinguishing mark indicating not "Check" but "Uncheck" be displayed.

In a case where the screen for displaying the browser is selected and a function name is displayed in a line, a function distinguishing mark indicating "Back" is displayed in a line. On the other hand, in a case where function names are displayed in two lines, the function distinguishing mark indicating "Back" is displayed in the first line, and a function distinguishing mark indicating "Forward" is displayed in the second line.

The display content determining section 6 (i) refers to the function name display table 13 in accordance with the determination result (the number of the function distinguishing marks to be displayed) supplied from the display mode determining section 5, and (ii) determines which function distinguishing mark should be displayed in the function name display area 91.

(Example of Display Screen of Display Section 9)

Figure 6:
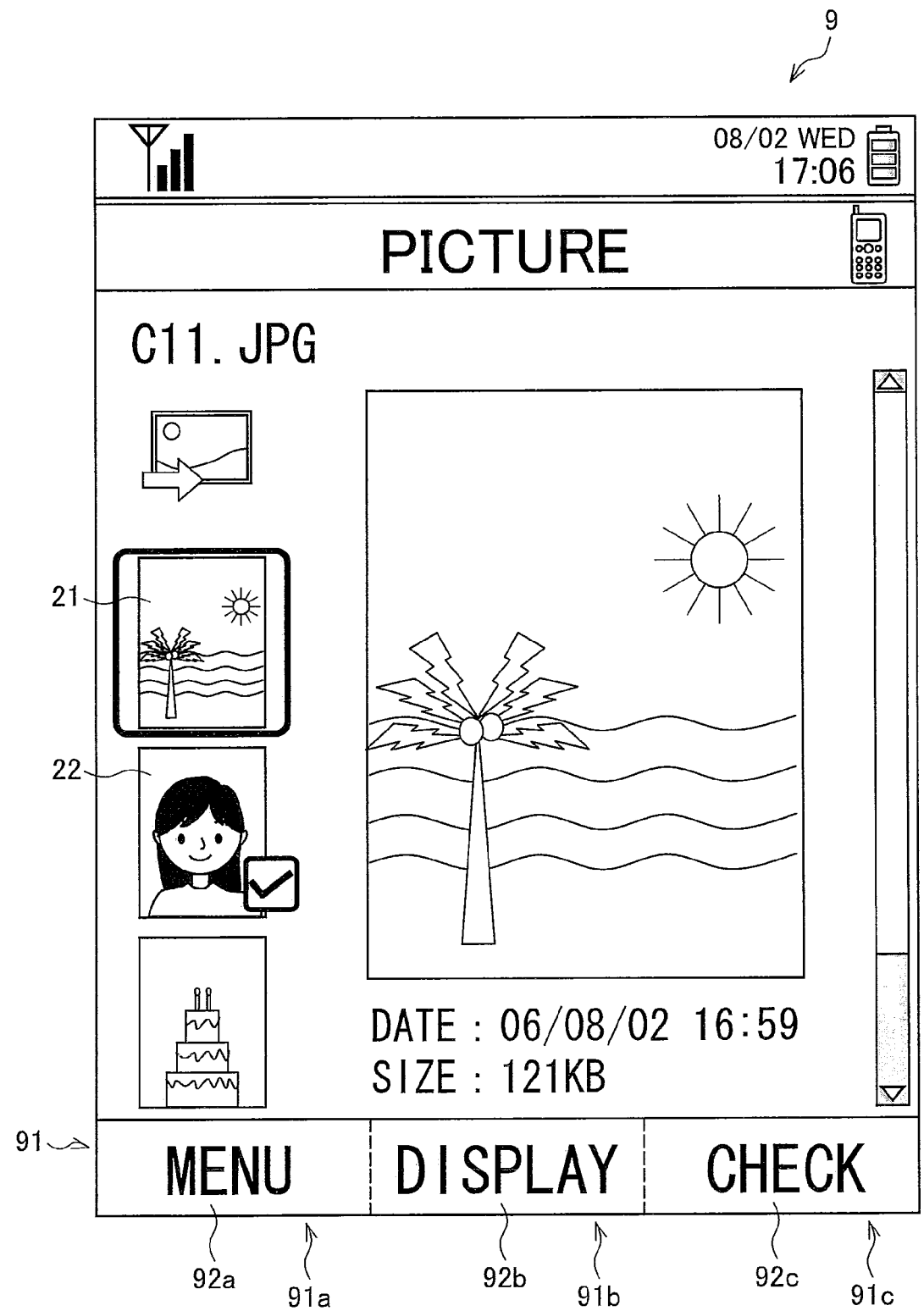
FIG. 6 is a diagram showing one example of a picture screen. The diagram shows a state in which a function distinguishing mark is displayed in one row in a right-side display area.
Figure 7:
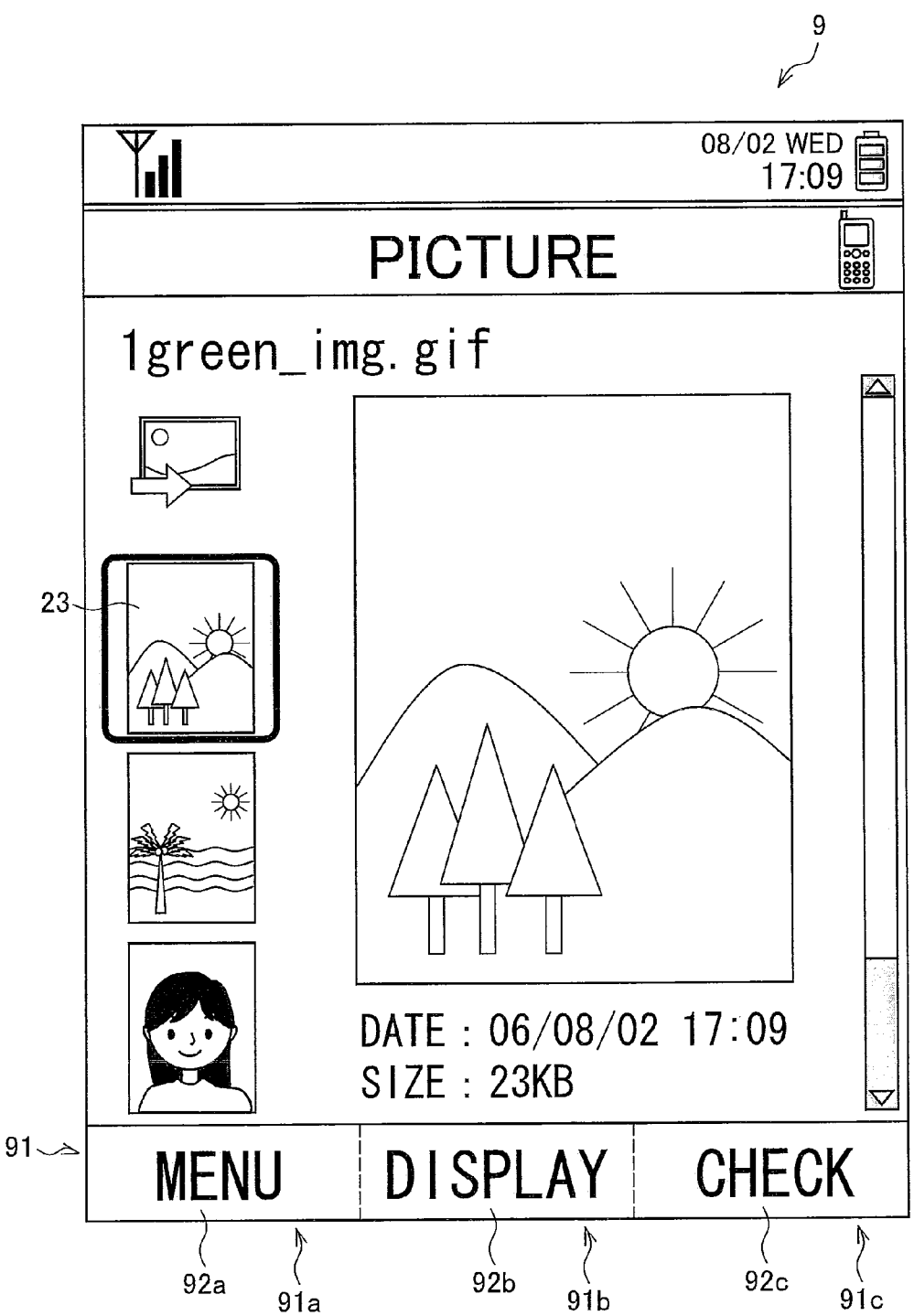
FIG. 7 is a diagram showing one example of the picture screen. The diagram shows a state in which the function distinguishing mark is displayed in one row in the right-side display area.
Figure 8:
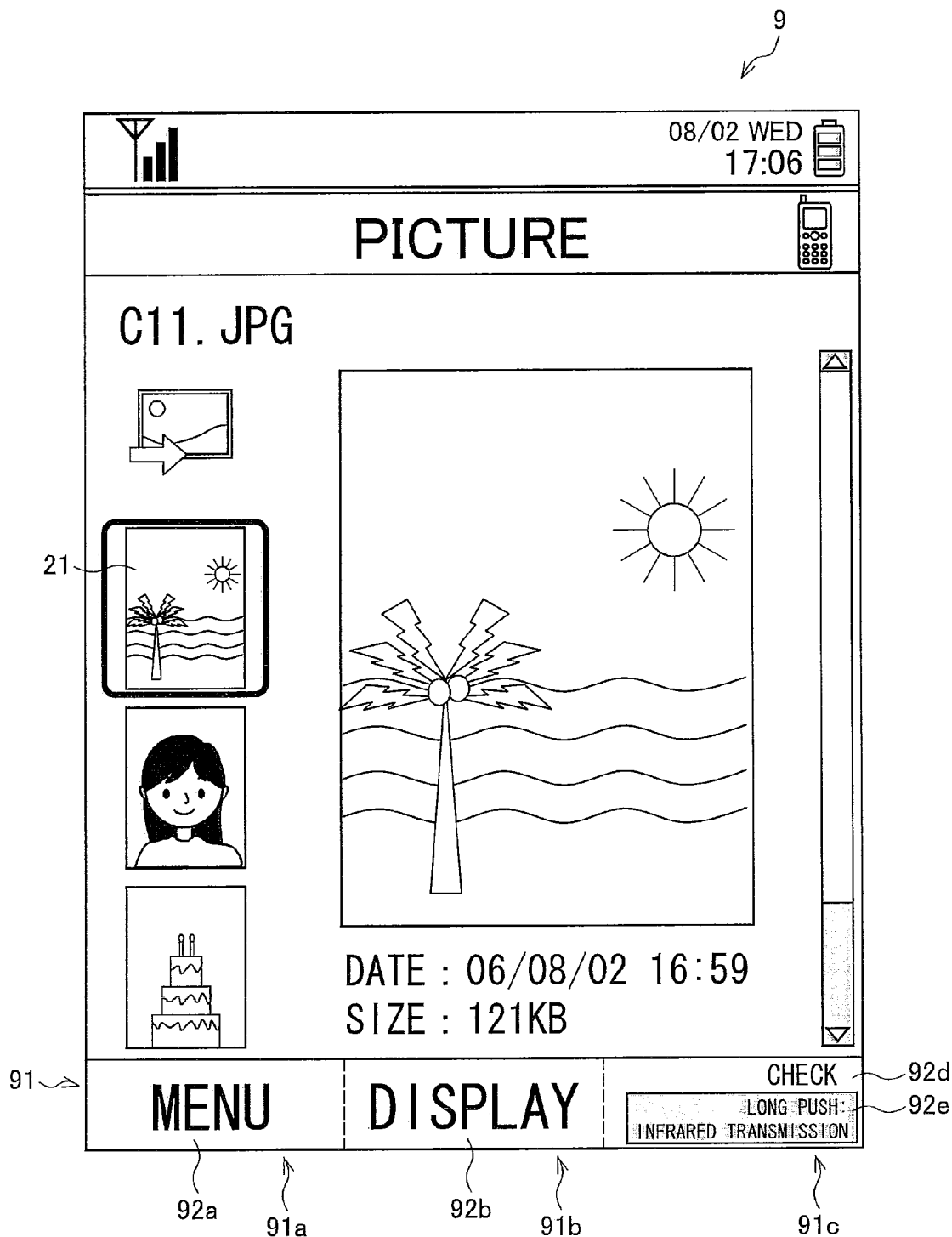
FIG. 8 is a diagram showing one example of the picture screen. The diagram shows a state in which function distinguishing marks are displayed in two rows in the right-side display area.

The following description deals with an example of the display screen of the display section 9 with reference to FIGS. 6 through 8. Each of FIGS. 6 through 8 is a diagram illustrating an example of the picture screen. Each of FIGS. 6 and 7 illustrates a state in which a function distinguishing mark 92c is displayed in a line in the right-side display area 91c. FIG. 8 illustrates a state in which function distinguishing marks 92d and 92e are displayed in two lines in the right-side display area 91c, respectively.

As illustrated in FIG. 6, a function distinguishing mark 92a indicating a function of calling a menu is displayed in the left-side display area 91a. A function distinguishing mark 92b indicating a function of zooming in a selected image (an image 21 in FIG. 6) is displayed in the central display area 91b. The high-speed infrared communication cannot be carried out in a case where there is an image selected by placing a checkmark (an image 22 in FIG. 6). As such, the function distinguishing mark 92c indicating "Check" is displayed in a line in the right-side display area 91c.

As illustrated in FIG. 7, the function distinguishing mark 92c indicating "Check" is displayed in a line in the right-side display area 91c, in a case where a selected image (an image 23 in FIG. 7) is an image which cannot be transmitted with the use of the high-speed infrared communication (e.g., a GIF (Graphic Interchange Format) image).

On the other hand, the function distinguishing mark 92d indicating "Check" is displayed in the first line (in the upper line) in the right-side display area 91c, and the function distinguishing mark 92e indicating "infrared communication" is displayed in the second line (in the lower line) in the right-side display area 91c, in a case where (i) there is no image selected by placing a checkmark and (ii) a selected image (the image 21 in FIG. 8) is an image transmittable with the use of the high-speed infrared communication (e.g., a JPEG (Joint Photographic Experts Group) image). In other words, the portable phone 1 concurrently displays on the display section 9 a plurality of functions assigned to a single function calling key 81.

That is, in a case where only "Check" is assigned to the right soft key 81c, the portable phone 1 displays, in a line in the right-side display area 91c, the function distinguishing mark 92c corresponding to the function of "Check." In contrast, in a case where "Check" and "high-speed infrared communication" are assigned to the right soft key 81c, the portable phone 1 displays, in upper and lower lines in the right-side display area 91c, the function distinguishing marks 92d and 92e corresponding respectively to the function of "Check" and the function of "high-speed infrared communication." The function distinguishing marks 92d and 92e are substantially half as high as a function distinguishing mark to be displayed in a line.

In other words, the portable phone 1 displays a function distinguishing mark in a line on the screen of the display section 9, in a case where the number of the function distinguishing marks to be displayed is one (1). On the other hand, the portable phone 1 displays a plurality of function distinguishing marks in lines on the screen. The number of the lines varies in accordance with the number of the plurality of function distinguishing marks to be displayed, in a case where the number is plural.

Put differently, the portable phone 1 divides the right-side display area 91c into two display areas where the function distinguishing marks 92d and 92e are displayed, respectively, in a case where two functions are assigned to the right soft key 81c. In other words, the portable phone 1 (particularly, the display mode determining section 5) changes the number of the display areas in accordance with the number of functions assigned to the right soft key 81c. The display mode and the display content are determined by the display mode determining section 5 and the display content determining section 6, respectively.

As illustrated in FIG. 8, it is preferable to add a mark (e.g., a character string "Long push") indicating an operation for calling a function to a function distinguishing mark indicating a function which can be called by carrying out an operation (e.g., a long push), other than a normal operation (e.g., a short push), with respect to a function calling key. This makes it possible to notify a user of what operation allows a function, corresponding to each of function distinguishing marks displayed in two lines, to be called.

It is preferable to give a color different from a background color to a function distinguishing mark indicating a function which can be called by carrying out an operation (e.g., a long push), other than a normal operation (e.g., a short push), with respect to a function calling key. This makes it possible to effectively notify a user of the presence of a function distinguishing mark in the second line. It is often the case that such a function distinguishing mark is suddenly displayed in the second line.

FIGS. 6 and 7 deal with picture screens, and the function distinguishing marks indicated by "Menu," "Display," and "Check" are displayed in the function name display area 91. As to another screen, function distinguishing marks are displayed in the function name display area 91 in accordance with said another screen.

In FIG. 8, the function distinguishing marks are displayed in the upper and lower lines in the right-side display area 91c. Instead, the function distinguishing marks can be displayed in the upper and lower lines in the left-side display area 91a, in a case where "Check" is assigned to the left soft key 81a. Alternatively, in a case where "Check" is assigned to the central soft key 81b, the function distinguishing marks can be displayed in the upper and lower lines in the central display area 91b. That is, the function distinguishing marks can be displayed in the upper and lower lines in a display area which is in the vicinity of a function calling key to which a plurality of functions are assigned.

Note that FIGS. 6 through 8 illustrates screens of the display section 9 and the screens are merely examples. The present invention is not limited to the design of the screens of the display section 9.

(Modification of Display Screen of Display Section 9)

Figure 9:
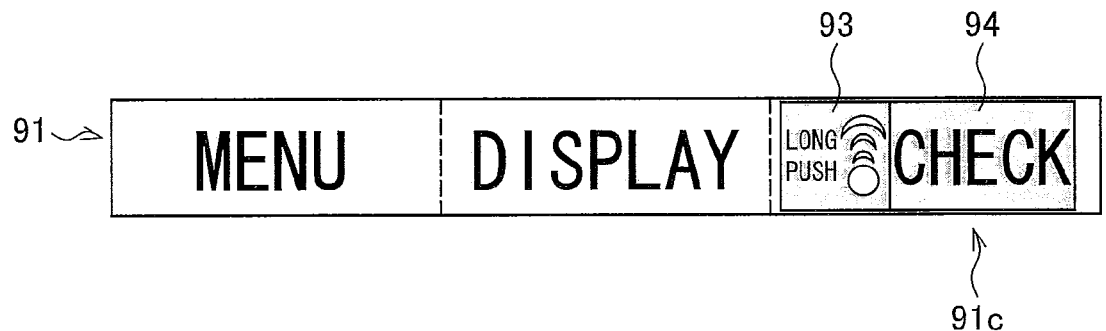
FIG. 9 is a diagram showing a modification of a display method for displaying the function distinguishing marks.

The following description deals with a modification of a display method for displaying function distinguishing marks with reference to FIG. 9. FIG. 9 is a view illustrating the modification of the display method for displaying the function distinguishing marks.

As illustrated in FIG. 9, two function distinguishing marks 93 and 94 can be displayed so as to be transversely adjacent to each other, in a case where the two function distinguishing marks are displayed in a single function name display area 91 (e.g., in the right-side display area 91c). According to the display method, it is difficult to display a character string. In view of this, an icon (the function distinguishing mark 93 in FIG. 9) is displayed as a function distinguishing mark.

Still and all, it is preferable to display character strings in two lines. This is because (i) a user can recognize more easily functions indicated by character strings, as compared to a case where the functions are indicated by icons, and (ii) a user can intuitively recognize the functions indicated by the character strings displayed in the upper and lower lines.

(Process Flow of Portable Phone 1)

Figure 10:
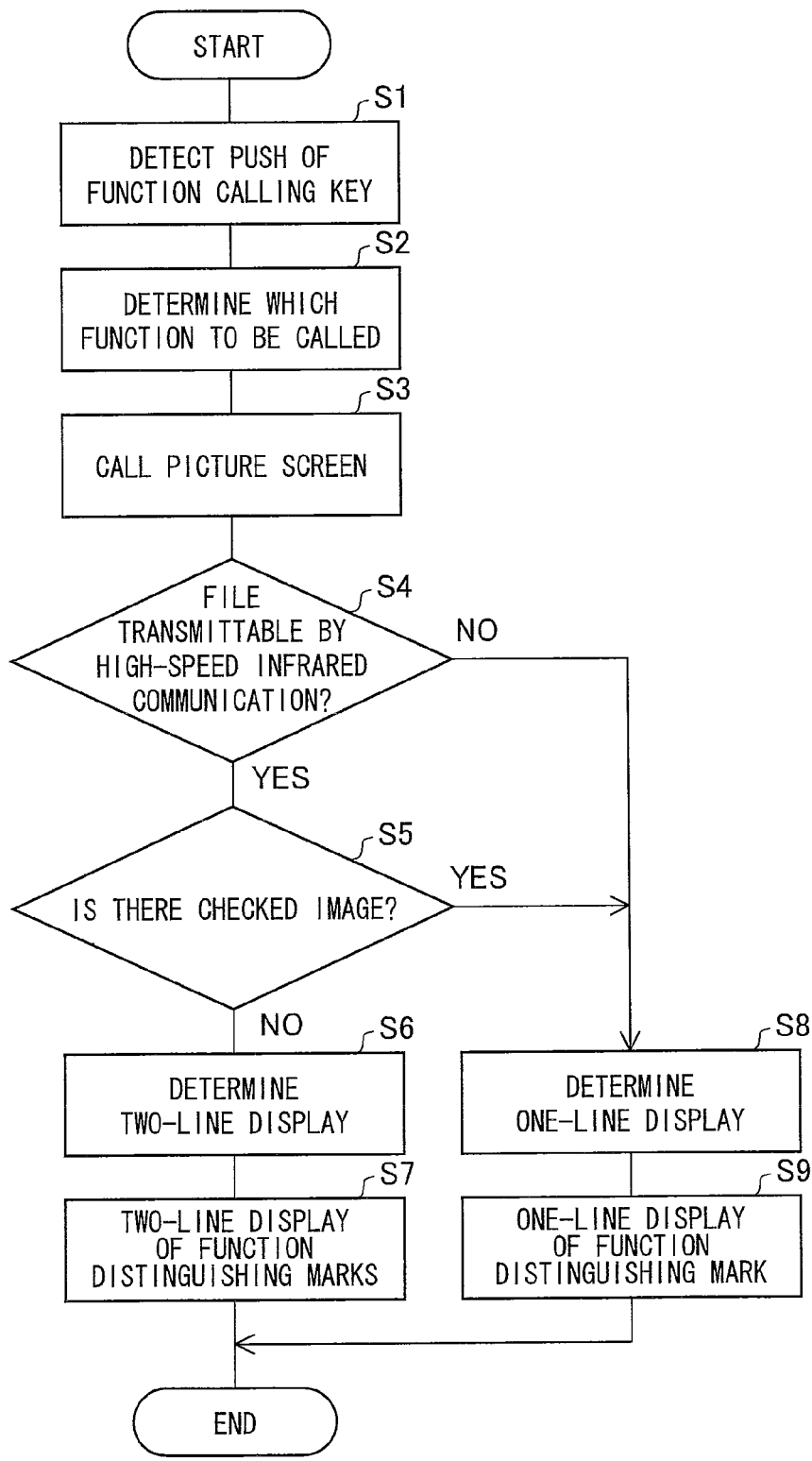
FIG. 10 is a flow chart illustrating one example of a flow of a process of the portable phone of the embodiment.

The following describes an example of a process flow of the portable phone 1 with reference to FIG. 10. FIG. 10 is a flow chart illustrating an example of the process flow of the portable phone 1. The following description deals with a process to be carried out by the portable phone 1 in a case where an operation for calling a picture screen is performed by a user.

First, upon detecting information that a function calling key 81 has been pushed down by a user while a standby screen is displayed, the key operation detecting section 71 supplies detected information to the function call determining section 3 (S1).

Upon receiving the detected information, the function call determining section 3 determines which function should be called, with reference to a function assigning table 11 corresponding to the standby screen (S2). Upon determining that an operation for calling the picture screen is performed, the function call determining section 3 supplies a determination result to the application executing section 4.

Upon receiving the determination result, the application executing section 4 boots an application for the picture screen. Thus, the application executing section 4 causes the display section 9 to display the picture screen, via the display controlling section 72 (S3).

After an operation for selecting an image displayed on the picture screen is performed by the user, the application executing section 4 determines whether or not the selected image is a file transmittable with the use of the high-speed infrared communication (S4).

If the selected image is not a file transmittable with the use of the high-speed infrared communication (NO in step S4), the application executing section 4 supplies communication impossible information indicating as such to the display mode determining section 5.

Upon receiving the communication impossible information, the display mode determining section 5 supplies to the display content determining section 6 an instruction (i.e., information indicating that the number of function distinguishing marks to be displayed is 1) to cause a function distinguishing mark to be displayed in a line, with reference to a display mode determining table 12 corresponding to the picture screen (S8) (display mode determining step).

Upon receiving the instruction, the display content determining section 6 supplies to the display section 9, via the display controlling section 72, an instruction to cause the function distinguishing mark indicating "Check" to be displayed in a line in the right-side display area 91c, with reference to a function name display table 13 corresponding to the picture screen.

Upon receiving the instruction, the display section 9 displays the function distinguishing mark indicating "Check" in a line in the right-side display area 91c (S9).

If the image is a file transmittable with the use of the high-speed infrared communication (YES in step S4), the application executing section 4 determines whether or not there is an image selected by placing a checkmark (S5). If the user places a checkmark to an image, then information indicating that the image is selected by placing a checkmark is stored in a temporary memory provided in the application executing section 4. The application executing section 4 determines presence or absence of an image selected by placing a checkmark, with reference to the information stored in the temporary memory.

If there is an image selected by placing a checkmark (YES in step S5), then the application executing section 4 supplies the communication impossible information to the display mode determining section 5. Descriptions of subsequent processes are omitted since they are the same as those described above.

On the other hand, if there is no image selected by placing a checkmark (NO in step S5), the application executing section 4 supplies to the display mode determining section 5 communication possible information indicating that the high-speed infrared communication is possible.

Upon receiving the communication possible information, the display mode determining section 5 supplies to the display content determining section 6 an instruction (i.e., information indicating that the number of function distinguishing marks to be displayed is two (2)) to cause function distinguishing marks to be displayed in two lines, with reference to a display mode determining table 12 corresponding to the picture screen (S6) (display mode determining step).

Upon receiving the instruction, the display content determining section 6 supplies to the display section 9 via the display controlling section 72 an instruction to cause (i) the function distinguishing mark indicating "Check" to be displayed in the first line in the right-side display area 91c, and (ii) the function distinguishing mark indicating "infrared communication" to be displayed in the second line in the right-side display area 91c, with reference to a function name display table 13 corresponding to the picture screen.

Upon receiving the instruction, the display section 9 displays the function distinguishing mark indicating "Check" and the function distinguishing mark indicating "infrared communication" in the first line and the second line in the right-side display area 91c, respectively (S7).

In a case where the user pushes down short the right soft key 81c, a checkmark is placed to a selected image. On the other hand, in a case where the user pushes down long the right soft key 81c, the selected image is transmitted by an infrared communication section 16 with the use of the high-speed infrared communication (not illustrated).

Upon completion of the user operation performed while the picture screen is displayed, the application executing section 4 exits the application for the picture screen, and causes the screen of the display section 9 to return to the standby screen.

(Effect of Portable Phone 1)

As described above, the portable phone 1 is a mobile terminal capable of (i) accepting a plurality of different operations to be performed with respect to a single operation key and (ii) executing a plurality of functions corresponding to the plurality of different operations, respectively. The portable phone 1 changes, in accordance with the number of functions assigned to a single function calling key 81, the number of the function distinguishing marks, indicating the functions, to be displayed on the display section 9.

Therefore, the portable phone 1 displays on the display section all the function distinguishing marks of a plurality of functions, in a case where the plurality of functions are assigned to a single function calling key 81. This makes it possible to notify a user that the plurality of functions are assigned to the single function calling key 81.

In addition, the portable phone 1 can change the number of the function distinguishing marks to be displayed, in accordance with the number of the functions assigned to a single function calling key 81. This makes it possible to efficiently use the function name display area 91 of the display section 9.

The portable phone 1 changes the sizes of the function distinguishing marks on the screen of the display section 9 in accordance with the number of the functions assigned to a single function calling key 81 (i.e., in accordance with the determined number of the function distinguishing marks to be displayed).

That is, the portable phone 1 reduces the sizes of the function distinguishing marks in a case where the number of the function distinguishing marks to be displayed is large, whereas the portable phone 1 increases the sizes of the function distinguishing marks in a case where the number of the function distinguishing marks to be displayed is small. This makes it possible to use the function name display area 91 more efficiently, and improve the viewability of the function distinguishing marks.

The short push and the long push of a function calling key 81 allow a plurality of functions to be called. As such, a function can be called by a single operation. This makes it possible to reduce the number of operations, as compared to an arrangement in which a user is required to call a menu in order to select a function.

Function distinguishing marks are displayed in accordance with the functions assigned to a function calling key 81. This makes it possible to notify what is a next operation that the user can perform. That is, this allows each of the function distinguishing marks to fulfill a role as an operation guide.

(Modification)

The present invention is not limited to the embodiments being thus described; it will be obvious that the same way may be varied in many ways within the scope of the claims. A new embodiment derived from a combination of a plurality of means disclosed in the foregoing embodiments is also included within the scope of the present invention.

The foregoing description deals with a case where the function name display area 91 has a fixed height. Instead, the function name display area 91 can have a height which varies in accordance with the number of the function distinguishing marks to be displayed.

In a case where function distinguishing marks are displayed in two lines, a function distinguishing mark to be displayed in the second line can be displayed so as to be outside and adjacent to the function name display area 91.

It is preferable to display a function distinguishing mark represented by a font in a case where the function distinguishing mark is displayed in a line, and to display an image in which function distinguishing marks are displayed in upper and lower lines in a case where the function distinguishing marks are displayed in two lines. This is suitable in a case where (i) the function name display area 91 has a limited height and (ii) there is no small font which allows the function distinguishing marks to be displayed in upper and lower rows.

As illustrated in FIG. 11, a ratio between the heights of upper and lower lines can be set to about 6:4 in a case where the function distinguishing marks are displayed in two lines. A function to be used frequently is usually assigned to the upper line. The display mode above gives rise to an advantage of the prominence of the upper line.

As described above, the three function calling keys, i.e., the left soft key 81a, the central soft key 81b, and the right soft key 81c are provided. This makes it possible to assign a maximum of six kinds of functions to the three function calling keys, thereby enhancing the convenience. However, the number and the layout of the function calling keys 81 are not limited to those described above.

The method for pushing down a function calling key 81 is not limited to the short push and the long push. Instead, it is possible to adopt different plural push-down methods. For example, it is possible to realize different calling functions by adopting the short push and double clicking.

The blocks of the portable phone 1, in particular, the display mode determining section 5 may be realized by way of hardware or software as executed by a CPU as follows:

The portable phone 1 includes a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the portable phone 1 a computer-readable storage medium containing control program (display mode determining program) code (executable program, intermediate code program, or source program) for the portable phone 1, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a Floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The portable phone 1 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth®, 802.11 wireless, HDR, mobile telephone network, satellite line, or terrestrial digital network. The present invention encompasses computer data signals embedded in a carrier wave, which computer data signals are the program code embodied through electronic transmission.

The mobile terminal preferably changes sizes of the function distinguishing marks to be displayed on a screen of the display means, in accordance with the number of the function distinguishing marks to be displayed.

According to the arrangement, the mobile terminal changes the sizes of the function distinguishing marks to be displayed on the screen, in accordance with the determined number of the function distinguishing marks to be displayed.

Therefore, the mobile terminal (i) reduces the sizes of the function distinguishing marks in a case where the number of the function distinguishing marks to be displayed is large and a display area for the function distinguishing marks is fixed, or, (ii) increases the sizes of the function distinguishing marks in a case where the number of the function distinguishing marks to be displayed is small and the display area for the function distinguishing marks is fixed. This makes it possible to use the display area for the function distinguishing marks more efficiently, and improve the viewability of the function distinguishing marks.

In a case where the number of the function distinguishing marks to be displayed is one, the mobile terminal preferably displays one function distinguishing mark in a line on the screen; and in a case where the number of the function distinguishing marks to be displayed is plural, the mobile terminal preferably displays the function distinguishing marks in plural lines on the screen in accordance with the number of the function distinguishing marks to be displayed.

According to the arrangement, the mobile terminal displays, in a case where the number of the function distinguishing marks to be displayed is one (i.e., in a case where one function is assigned to an operation key), a function distinguishing mark corresponding to the function in one row on the screen of the display means; The mobile terminal displays, in a case where the number of the function distinguishing marks to be displayed is plural (i.e., a plurality of functions are assigned to an operation key), function distinguishing marks corresponding respectively to the plurality of functions in plural rows on the screen.

This makes it possible to use the display area for the function distinguishing marks efficiently and display the function distinguishing marks so that a user can easily recognize the function distinguishing marks intuitively, in a case where the display area for the function distinguishing marks is fixed.

The different operations are preferably operations causing a period during which the single operation key is pushed down to vary.

According to the arrangement, different functions can be executed depending on whether time during which a single operation key is pushed down is long or short. That is, the different functions can be executed depending on whether the single operation key is pushed down shorter than a predetermined time or pushed down for the predetermined time or longer.

Therefore, the different functions can be executed in accordance with an entry through a simple operation of switching the time for pushing down an operation key between long time and short time.

The technical scope of the present invention also encompasses (i) the display mode determining program for causing a computer to realize a function of changing in accordance with the number of functions assigned to a single operation key the number of the function distinguishing marks to be displayed which indicate the functions, and (ii) a computer-readable storage medium storing the display mode determining program.

INDUSTRIAL APPLICABILITY

The present invention can display, with high viewability, a plurality of functions assigned to a single operation key. Therefore, the present invention is suitably applicable to a mobile terminal, in particular, a mobile terminal, having limited operation keys, which is supposed to be operated by one hand.

The invention claimed is:

1. A mobile terminal capable of executing a plurality of functions in response to different operations to be performed with respect to a single operation key, comprising a display device for displaying a plurality of function distinguishing marks indicating the plurality of functions, the number of functions to be assigned to the single operation key being changeable according to which operation screen is displayed by an application selected by a user, the number of the function distinguishing marks to be displayed being changed in accordance with the number of the functions assigned to the single operation key.

2. The mobile terminal as set forth in claim 1, wherein sizes of the function distinguishing marks to be displayed on a screen of the display device are changed in accordance with the number of the function distinguishing marks to be displayed.

3. The mobile terminal as set forth in claim 2, wherein:
   in a case where the number of the function distinguishing marks to be displayed is one, a function distinguishing mark is displayed in a line on the screen; and
   in a case where the number of the function distinguishing marks to be displayed is plural, the function distinguishing marks are displayed in plural lines on the screen in accordance with the number of the function distinguishing marks to be displayed.

4. The mobile terminal as set forth in claim 1, wherein the different operations are operations causing a period during which the single operation key is pushed down to vary.

5. A display mode determining program for causing a computer to realize the function, recited in claim 1, of changing the number of the function distinguishing marks to be displayed in accordance with the number of the functions assigned to the single operation key.

6. A computer-readable storage medium storing a display mode determining program recited in claim 5.

7. A display method for displaying a plurality of function distinguishing marks in a mobile terminal,
   said mobile terminal capable of executing a plurality of functions in response to different operations to be performed with respect to a single operation key, the mobile terminal comprising a display device for displaying the plurality of function distinguishing marks indicating the plurality of functions,
   said method comprising the steps of
   changing the number of functions to be assigned to the single operation key, in accordance with which operation screen is displayed by an application selected by a user; and
   changing the number of the function distinguishing marks to be displayed in accordance with the number of the functions assigned to the single operation key.

* * * * *